Nov. 11, 1941.     W. H. KOPITKE     2,262,612
METHOD OF AND MEANS FOR FORMING ARTICLES OF PLASTIC MATERIAL
Filed May 13, 1938     2 Sheets-Sheet 1
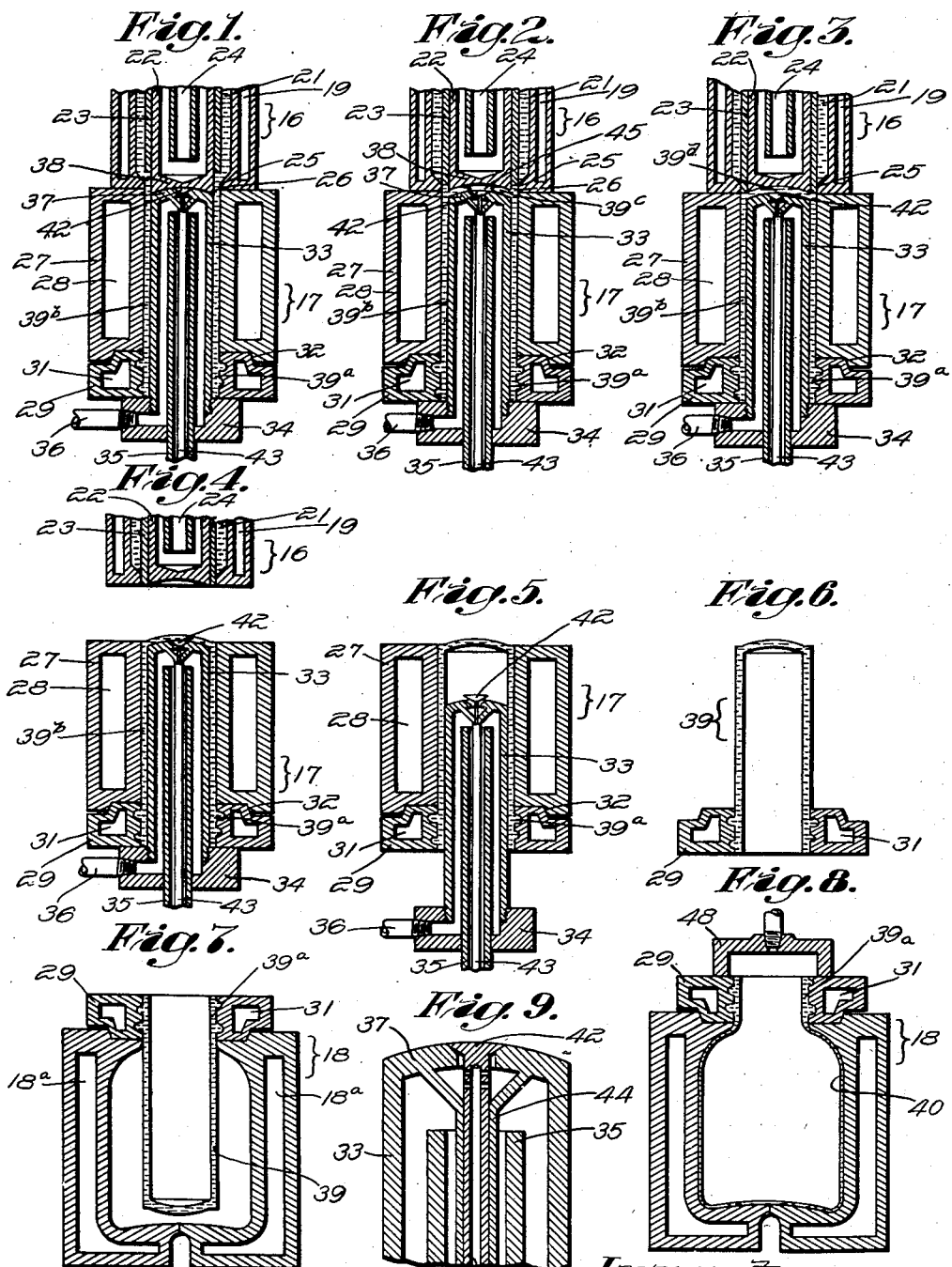
Witness
W. B. Thayer.
Inventor
William H. Kopitke
by Brown & Parham
Attorneys

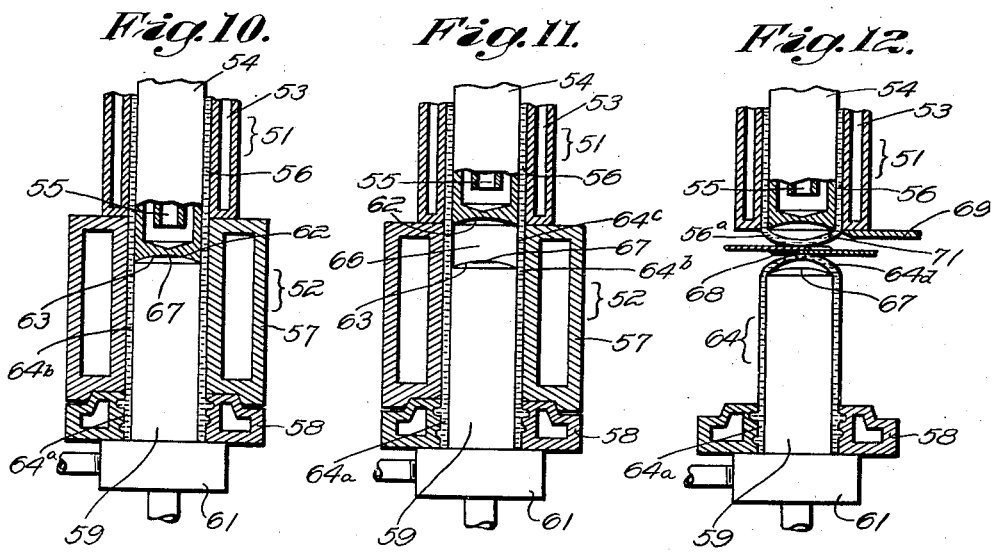
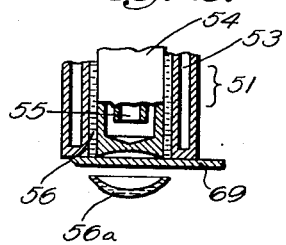
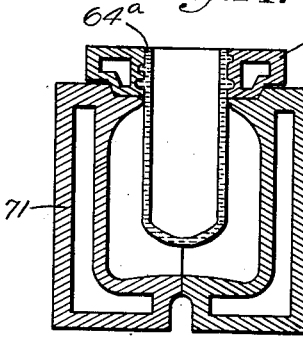
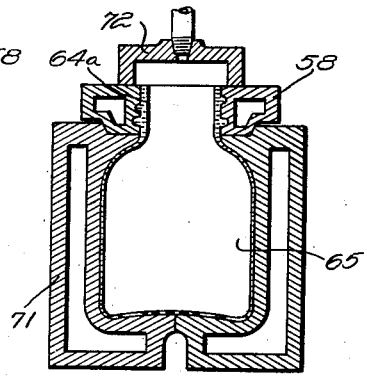

Patented Nov. 11, 1941

2,262,612

UNITED STATES PATENT OFFICE 2,262,612

METHOD OF AND MEANS FOR FORMING ARTICLES OF PLASTIC MATERIAL

William H. Kopitke, West Hartford, Conn., assignor, by mesne assignments, to Plax Corporation, Hartford, Conn., a corporation of Delaware Application May 13, 1938, Serial No. 207,702

10 Claims. (Cl. 18—5)

This invention relates to methods of and means for forming hollow articles of plastic material and has particular relation to such methods and means wherein plastic material is supplied in tubular form by extruding apparatus, the tube is closed to form a bottom for a hollow article and the article is severed from the material in the extruding apparatus.

The method may be employed in working organic plastic materials of various kinds such as cellulose derivatives and natural or synthetic gums or resins and adapted for use in making hollow articles such as, containers. However, I prefer to employ plastic materials which do not shrink appreciably after being formed into the desired shapes. The invention is described in its application to the shaping of thermoplastic material such as cellulose acetate free, or substantially free, of solvents although it also may be employed in molding thermosetting materials.

In methods heretofore proposed for forming hollow articles from plastic material in tubular form difficulty has been experienced in the shaping of the material for the bottom of an article due to the fact that often the material does not readily weld or fuse. The result is that the articles may have defects in the bottom portions thereof.

It is an object of this invention to provide a novel method and novel means of the above character by the employment of which the formation of the bottom of articles is facilitated and defects therein largely reduced or eliminated. This may be accomplished by applying pressure to the tubular material while it is maintained in proper working condition to force it inwardly of the tube and thus close the tube and form a bottom.

A further object of the invention is to provide a method and means of the above character by the use of which an article formed from tubular material may be severed from the material in the extruding device in a novel and efficient manner. The severing operation may be performed in such a way as cleanly to cut the material so that a rough or irregular end is not left on the material in the extruding device which would interfere with the succeeding forming operation or might cause a defect in the article which subsequently is formed.

Still another object of the invention is to provide a novel method and novel means for forming hollow articles wherein an article is formed from tubular material by "injection molding" such material in a mold. By "injection molding" is meant the introduction of plastic material under pressure preferably accompanied by heat to a mold cavity closed except where the material enters and thus filling said cavity. In other words the hollow article is given its shape, at least initially, by forcing the material under pressure into and filling a cavity entirely confined between molding surfaces. This permits accurate control of the shape of the article and of the distribution of material in the walls thereof.

"Injection molding" as defined above and as understood in the art differs from "extrusion molding" wherein plastic material is shaped by forcing it through a die into the atmosphere or into a space only partly confined by molding surfaces. In other words, in injection molding, the plastic material is forced under hydrostatic pressure into a die until the die is filled. In "extrusion molding" the extruded material is not usually delivered to a die or mold at all and if it is, the die or mold is not filled thereby, and therefore the plastic is not given an exact and predetermined shape by filling the die or mold as it is in injection molding. However, as a matter of convenience, I have designated the tube forming and feeding apparatus or device as "an extruding device," even though it is utilized in injection molding as distinguished from extrusion molding.

Other objects and advantages of the invention will be pointed out in the detailed description which follows and which has reference to the accompanied drawings, in which drawings;

Figs. 1 to 9 inclusive are views in central vertical section of apparatus embodying the invention, said views depicting several steps in the performance of the novel method;

Figs. 10 to 15 inclusive are similar views showing modifications of the apparatus illustrated in Figs. 1 to 9 and likewise illustrating several steps of a modification of the method shown in Figs. 1 to 9.

Referring specifically to the drawings there is shown at 16 a nozzle or extruding device for supplying plastic material in tubular form to a mold unit indicated generally at 17. At 18 is shown a finishing blow mold in which articles are blown to final form as hereinafter explained.

The outer casing of extruding device 16 contains a chamber 19 through which a heating medium such as oil or steam may be circulated to maintain the plastic material, indicated at 21, in plastic or working condition. In order to simplify the illustration of the apparatus the means for feeding and heating the plastic material supplied to the device 16 has been omitted but it will be understood that suitable known means may be provided for such supply.

The extruding device 16 contains a plunger 22 on which a sleeve 23 is slidably fitted. Plunger 22 is hollow and hot oil or other medium may be supplied thereto by pipe 24, the exhaust for such oil not being shown, so that the plastic material in the device is heated internally through the plunger 22 and sleeve 23 as well as externally through the casing.

The outlet 25 of the extruding device is formed by an inwardly extending lip or flange which outlet, therefore, is of less diameter than the passage above it and which reduces the diameter of the tubular material as it issues from the device as shown at 26 to the desired diameter for injection into the mold unit 17. The sleeve 23 is adapted to slide through opening 25 for purposes later explained.

The mold unit 17 comprises a body mold 27 adapted to engage the bottom of the extruding device 16 in axial alignment therewith. The body mold is chambered at 28 to receive temperature controlling medium and is engaged at its bottom end by a neck mold 29 likewise chambered at 31. The neck mold has a boss 32 thereon which is received by a complementary recess in the body mold 27 to align the molds.

Extending through neck mold 29 and body mold 27 is an internal former or core 33 screw threaded into a head 34 which engages the neck mold 29. This core likewise is made hollow and temperature controlling medium flows into it through a pipe 35 held in head 34 and out of it through an exhaust pipe 36 in said head. The upper end of core 33 preferably has a tight fit with the bottom of plunger 22 when the mold unit is engaged with the extruding device. In the apparatus as shown, the head 37 of the core is made convex while the bottom 38 of plunger 22 is made concave and the plunger and core are of the same diameter (as are the opening 25 and the interior of mold 27).

A valve 42 is provided in the head 37 of the core 33 which valve is operated by means not shown, attached to the hollow stem 43 of the valve. A sleeve or casing 44 serves as a guide for the valve stem 43 and separates the valve from the interior of the core through which the temperature controlling medium is circulated. The valve stem 43 is made hollow for the passage of air from within the stem past the valve. Valve 42 is held seated during the formation of a blank and is later opened as hereinafter explained for the passage of air to the interior of the blank.

The mold unit thus constructed provides an annular cavity for the formation of the neck finish 39a of a blank in neck mold 29 and the body portion 39b of the blank in mold 27 when the plastic material in tubular form is injection molded into the mold unit. When the annular cavity is thus filled by injection molding, the plunger 22 is raised and the sleeve 23 is lowered.

When the plunger 22 is raised a cavity is formed at 45 between the ends of the core and plunger, this cavity being of the desired shape for forming a bottom on the tubular blank. The cavity 45 is filled by the injection of a portion of the tubular material initially formed around the bottom of plunger 22. Such injection is effected by the descent of sleeve 23. In Fig. 2 the beginning of this injection is shown, plastic material being shown at 39c as it is being forced into the cavity 45 by the downward movement of sleeve 23. In Fig. 3 sleeve 23 is shown in its lowermost position and cavity 45 has been filled with material injected therein by the sleeve to form the bottom 39d. This completes the formation of blank 39.

As sleeve 23 moves into opening 25 it severs blank 39 from the tubular material in the device 16. The downward stroke of sleeve 23 is of the proper length and the opening 25 is of the proper depth to insure that the required amount of plastic material from the tube thereof will be injected into and fill cavity 45.

The valve 42 preferably is held closed when the plunger 22 is raised to create a partial vacuum in cavity 45 which will assist in filling the cavity with plastic material.

The mold unit 17 containing the completely formed blank may now be disengaged from the extruding device 16 as shown in Fig. 4 and the core 33 withdrawn from within the blank as illustrated in Fig. 5. To assist this withdrawal of the core, the core may be tapered as desired and for the formation of certain types of articles both the core and the body mold 27 may be tapered to form a blank of the desired design for the desired distribution of material in the walls of a finished article. The withdrawal of the core also is assisted by the opening of valve 42 to admit air to the interior of the blank.

After the core is withdrawn the blank mold 27 may be removed, leaving the completed blank 39 supported by the neck mold 29 as shown in Fig. 6. The blank now may be inserted in the finishing or blow mold 18 as shown in Fig. 7 and blown to final form therein by air or other fluid which preferably is heated and is supplied by means of a blow head 48 which engages the neck mold as shown in Fig. 8. Thus a hollow article 40 is formed.

It will be understood that the blank mold 27 and neck mold 29 may be made in sections suitably pivoted for opening and closing movements. The finishing mold 18 is shown as being made of sections and also provided with chambers 18a for temperature controlling medium.

During the formation of a blank of thermoplastic material and the blowing of the blank to final form the various molds are maintained at the proper temperature by the circulation of temperature controlling fluid therethrough. The neck mold may be cooled at all times. Preferably the blank mold and core 33 are not cooled but maintained as warm as possible to keep the material in plastic condition. In some cases it may be desirable or necessary to cool the neck mold and core somewhat after the blank is formed so that the blank will not stick to them when the core is being withdrawn and the blank mold removed. Where it is necessary or desirable to cool the blank mold and core it may also be desirable to warm the blank before it is blown in the finishing mold. This may be accomplished by radiant heat or quickly moving a flame over the blank or in lieu of this the blank may be warmed solely by the heating medium which is employed for blowing it and also by circulating heating medium through the finishing mold. When the blank is finally blown into contact with the wall of the finishing mold or before that time a cooling medium is circulated through the chambers 18a of the finishing mold in order to cause the material in the finishing article 40 to set.

It will be understood that the above description of the control of temperatures in the various parts of the apparatus is given by way of example only. The degrees of temperature which may be maintained have not been specified because the temperatures will vary according to the composition of the material. Also, the temperatures of the various parts when forming thermosetting materials will be different from those employed in forming thermoplastic materials, it being necessary to provide heating instead of cooling to set the material and cooling instead of heating to prevent hardening or premature hardening or to maintain the material in uncured or partially cured condition for further shaping operations.

Suitable mechanism (not shown) may be provided for operating the various parts of the apparatus in the desired time relation. Such mechanism has not been illustrated or described in detail because it may readily be provided by one skilled in the art by following the teaching of the invention disclosed herein.

In the modified form of apparatus shown in Figs. 10 to 15, the extruding device is indicated at 51 and blank mold unit at 52. The extruding device is chambered at 53 and contains a plunger 54 through which a heating medium is circulated by means including the tube shown at 55. The plunger 54 cooperates with the casing of the device to form and extrude plastic in tubular form as indicated at 56. The blank mold unit 52 comprises the blank mold 57, neck mold 58, and a core 59 carried by head 61. The molds are chambered and the core made hollow to receive temperature controlling medium as in the apparatus of Figs. 1 to 9.

The plunger 54 in this case is of such length that it may be lowered well within the cavity of the blank mold 57 so that its concave bottom 62 is brought into engagement with the convex top 63 of the core 59. The core 59 terminates a substantial distance below the top of the cavity of the blank mold, as shown.

With the parts in assembled relation as shown in Fig. 10 the plastic material is injection molded into the cavity formed between the neck and blank molds and the core and lower portion of the plunger. This forms the neck finish 64a and body portion 64b of the blank. The plunger 54 is now raised to disengage it from the core and to leave a space 66 between plunger and core as shown in Fig. 11. A valve 67 in the core, which is similar to valve 42 in Figs. 1 and 9, may be opened for the admission of air above the core to prevent the creation of a vacuum in space 66.

The blank mold 57 now is removed which exposes the tubular connection 64c between the body portion 65 of the blank and the material 56 in the extruding device, this connection being shown in Fig. 11. The connection 64c now may be constricted or "necked in" and severed in such a manner as to close the bottom of the blank. To accomplish this I have shown at 68 a pair of V-notched shear blades which on being closed about the connection will constrict the material and close the bottom of the blank forming a bottom 64d therein, Fig. 12.

The constricting and severing operation will likewise close the bottom of the tubular material 56 as shown at 56a. This closure 56a now is removed by knife 69 which slides across the bottom of the device 51 as illustrated in Figs. 12 and 13. The removal of this material leaves the tubular material 56 in the device in proper form to be injected into another blank forming unit (not shown) or into unit 52 for the formation of the succeeding blank.

After the shear 68 has operated to disconnect the blank, the core 59 is withdrawn, the core being tapered if desired and air admitted to the interior of the blank past valve 67 to assist such withdrawal. The blank may now be transferred by means of the neck mold to a finishing mold 71 and blown to a final form therein by pressure medium introduced through a blow head 72, Fig. 15.

The parts of the apparatus may be maintained at the desired temperatures and operated in time relation as explained with reference to Figs. 1 to 9.

Various changes may be made in the details of construction of the apparatus and in the mode of operation without departing from the scope of the appended claims.

It will be understood that certain types of finished articles (other than blanks which are to be blown to final form and other than narrow neck articles) may be produced solely by means of the extruding devices and blank mold units of Figs. 1 to 5 and Figs. 10 to 13. Therefore, the word "article" or "articles" as is used in the claims is a term generic to blanks or preforms and finished objects unless otherwise required by the express language of said claims.

Having described my invention of which I claim is:

1. The method of forming hollow articles of plastic material which comprises first forming a tube of such material in, and then feeding said tube from an extruding device into the cavity of a mold unit and molding the material in said mold unit by filling said cavity with said tube under pressure to form the walls of an article, providing a space within which to form a bottom for the article, shaping in said space a portion of said tube into a bottom for said article, and severing the article from the remainder of said tube.

2. The method of forming hollow articles of plastic material which comprises first forming a tube of such material in, and then feeding said tube from an extruding device into the annular cavity of a mold unit and molding the walls of an article in said unit by filling said cavity with said tube under pressure, providing a space within which to form a bottom for the article, displacing in said space a portion of the material of said tube transversely and inwardly of the tube to close the tube and form a bottom of the article and severing the article from the remainder of said tube.

3. The method of forming hollow articles of plastic material which comprises first forming and then feeding a tube of such material into a blank mold unit having an annular cavity and molding the walls of a blank in said cavity by filling said cavity with said tube, providing a space within which to form the bottom for said blank, shaping in said space a portion of the material of said tube into a bottom for the blank, severing the blank from the remainder of said tube, transferring the blank to a blow mold, and blowing the blank to final form in said blow mold.

4. The method of forming hollow articles of plastic material which comprises first forming and then feeding a tube of such material into the cavity of a blank mold and neck mold and molding the neck finish and body of a blank by filling said cavity with said tube, providing a space within which to form a bottom for the blank, forming within said space a bottom on said blank from a portion of said tube, severing the blank from the remainder of said tube, enclosing the blank thus formed in a blow mold, and blowing the blank in said blow mold.

5. The method of forming hollow articles of plastic material which comprises injection molding a tube of such material in an annular mold cavity by filling said cavity to form the walls for an article, enlarging the mold cavity to provide a bottom forming cavity, and injection molding a bottom for said article integral with the tube in said bottom forming cavity.

6. The method of forming hollow articles of plastic material which comprises first forming a tube of such material in, and then feeding said tube from an extruding device into an annular mold cavity and molding the walls of an article in said cavity by filling said cavity with said tube, providing a bottom forming cavity and simultaneously severing said tube and injecting a portion thereof into said bottom forming cavity for forming the bottom of said article.

7. The method of forming hollow articles of plastic material which comprises first injection molding a tube of material in an annular mold cavity by filling said cavity to form the walls of a blank, then providing a bottom forming mold cavity contiguous to one end of the annular cavity, then injection molding a bottom for the blank in said bottom forming cavity, enclosing the blank thus formed in a blow mold, and blowing the blank to final form in said blow mold.

8. The method of forming hollow articles of organic plastic material which comprises forming such material into a tube, injection molding a portion of said tube of material in an annular mold cavity to form the walls of a blank and excess tubular material, providing a space for forming a bottom on the walls of said blank, constricting, closing and severing said excess tubular material from the remainder of said tube to form the bottom of the blank, enclosing the blank thus formed in a blow mold, and blowing the blank in said blow mold.

9. Apparatus for forming hollow articles from plastic material comprising an extruding device for supplying a tube of such material and a mold unit adapted to be engaged with said device, said mold unit comprising a core, a plunger in said extruding device adapted to engage said core to form an annular cavity in position to receive said tubular material and in which the walls of an article are molded from such material, and means for shaping a portion of said tubular material into a bottom for said article and for severing the article from said tube.

10. Apparatus for forming articles from plastic material comprising an extruding device for supplying a tube of such material, a mold unit adapted to be engaged with said device, said mold unit including a core, said extruding device including a plunger adapted to engage said core and providing therewith an annular cavity in position to receive said tubular material and in which the walls of an article are molded from such material, and said plunger being adapted to be disengaged from said core to provide a bottom forming cavity within said tubular material, and a sleeve slidably mounted on said plunger for severing said tubular material and for injecting a portion thereof into said bottom forming cavity to form the bottom of said article.

WILLIAM H. KOPITKE.